(12) United States Patent
Tanji et al.

(10) Patent No.: US 11,165,657 B2
(45) Date of Patent: Nov. 2, 2021

(54) ANALYSIS DEVICE AND ANALYSIS METHOD

(71) Applicant: Nippon Telegraph and Telephone Corporation, Tokyo (JP)

(72) Inventors: Naoyuki Tanji, Tokyo (JP); Hiroshi Kato, Tokyo (JP); Hiroyuki Yazaki, Tokyo (JP); Nobuo Onai, Tokyo (JP); Hiroyuki Tanaka, Tokyo (JP); Kensuke Takahashi, Tokyo (JP); Naoki Take, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/971,457

(22) PCT Filed: Feb. 22, 2019

(86) PCT No.: PCT/JP2019/006723
§ 371 (c)(1),
(2) Date: Aug. 20, 2020

(87) PCT Pub. No.: WO2019/163932
PCT Pub. Date: Aug. 29, 2019

(65) Prior Publication Data
US 2020/0396136 A1  Dec. 17, 2020

(30) Foreign Application Priority Data
Feb. 26, 2018  (JP) .............................. JP2018-032366

(51) Int. Cl.
*H04L 12/24* (2006.01)
*G06N 5/04* (2006.01)

(52) U.S. Cl.
CPC ............. *H04L 41/145* (2013.01); *G06N 5/04* (2013.01)

(58) Field of Classification Search
CPC ........ G06N 20/00; G06N 5/022; G06N 7/005; G06F 11/3452; G06F 17/18; H04L 41/142; H04L 63/1425; G05B 2219/33002
See application file for complete search history.

(56) References Cited

U.S. PATENT DOCUMENTS 10,645,022 B2 * 5/2020 Kaminski ............... H04L 47/70
2012/0226475 A1 * 9/2012 Asai ................... G05B 19/4184
702/179

(Continued)

FOREIGN PATENT DOCUMENTS

JP       2017-143452       8/2017

*Primary Examiner* — Chirag R Patel
(74) *Attorney, Agent, or Firm* — Fish & Richardson P.C.

(57) ABSTRACT

An analysis device for analyzing services on a network includes: a storage unit configured to store, maintenance information collected, from the network, at a predetermined time interval and for each of the services, application rules describing a technique for applying a plurality of types of analysis logics classified by use, and a catalog describing specifications of the analysis logics; a rule application unit configured to, upon receipt of a request related to an analysis target service, apply the maintenance information over a predetermined period of the analysis target service to the application rules; an analysis logic selection unit configured to select the analysis logics for each use based on a result of the application to the application rules; and a collaborative catalog generation unit configured to generate a collaborative catalog including a combination of the catalogs describing the specifications of the selected analysis logics.

8 Claims, 4 Drawing Sheets

(56) References Cited

U.S. PATENT DOCUMENTS

| | | | |
|---|---|---|---|
| 2016/0103559 A1* | 4/2016 | Maheshwari | G06F 3/0481 |
| | | | 715/738 |
| 2016/0359872 A1* | 12/2016 | Yadav | H04L 63/1425 |
| 2018/0046926 A1* | 2/2018 | Achin | G06Q 10/04 |
| 2018/0219889 A1* | 8/2018 | Oliner | G06N 3/04 |

* cited by examiner

| NAME | CLASSIFICATION/USE | INPUT | OUTPUT | PARAMETER | REMARKS |
|---|---|---|---|---|---|
| KEYWORD COUNT | PREPROCESSING | CHARACTER STRING | INTEGER | KEYWORD: X | OUTPUT THE NUMBER OF KEYWORDS APPEARING IN INPUT CHARACTER STRING |
| SEASONAL CYCLE EXTRACTION | PREPROCESSING | ONE-DIMENSIONAL TIME SERIES NUMERICAL VALUE | CYCLE OF SEASONAL COMPONENT: S | | |
| AUTOCORRELATION | PREPROCESSING | ONE-DIMENSIONAL TIME SERIES NUMERICAL VALUE | AUTOCORRELATION COEFFICIENT | integer: t | OUTPUT AUTOCORRELATION COEFFICIENT WITH DATA POINT PRECEEDING BY t |
| LOOP | CALCULATE SCORE VALUE | N-DIMENSIONAL TIME SERIES NUMERICAL VALUE | TIME SERIES NUMERICAL VALUE (0 to 1) | INTEGER: K NUMERICAL VALUE: λ | |
| K-NEAREST NEIGHBOR METHOD | CALCULATE SCORE VALUE | ONE-DIMENSIONAL TIME SERIES NUMERICAL VALUE | TIME SERIES NUMERICAL VALUE | INTEGER: W | |
| HOLT-WINTERS METHOD | CALCULATE SCORE VALUE | ONE-DIMENSIONAL TIME SERIES NUMERICAL VALUE | TIME SERIES NUMERICAL VALUE | INTEGER: K CYCLE: S | OUTPUT IS DIFFERENCE FROM PREDICTION MODEL |
| NORMAL DISTRIBUTION | THRESHOLD CALCULATION | TIME SERIES NUMERICAL VALUE | THRESHOLD | CUMULATIVE PROBABILITY: R | |
| FIXED THRESHOLD | THRESHOLD CALCULATION | TIME SERIES NUMERICAL VALUE | THRESHOLD | NUMERICAL VALUE: T | |

Fig. 2

| NAME | IF | THEN |
|---|---|---|
| PREPROCESSING APPLICATION RULE | INPUT = CHARACTER STRING | SELECT KEYWORD COUNT |
| | INPUT = TIME SERIES NUMERICAL VALUE | SELECT AND CALCULATE AUTOCORRELATION |
| | INPUT = TIME SERIES NUMERICAL VALUE AUTOCORRELATION COEFFICIENT > 0.7 | CALCULATE: S USING SEASONAL CYCLE EXTRACTION RESULT |
| SCORE VALUE CALCULATION APPLICATION RULE | INPUT = TWO-DIMENSIONAL TIME SERIES NUMERICAL VALUE | SELECT LOOP (DEFAULT PARAMETER) |
| | INPUT = ONE-DIMENSIONAL TIME SERIES NUMERICAL VALUE CYCLE S > 1 | SELECT HOT WINTER METHOD |
| | INPUT = ONE-DIMENSIONAL TIME SERIES NUMERICAL VALUE CYCLE: S ≤ 1 | SELECT K-NEAREST NEIGHBOR METHOD (DEFAULT PARAMETER) |
| THRESHOLD CALCULATION APPLICATION RULE | INPUT FOLLOWS NORMAL DISTRIBUTION | SELECT NORMAL DISTRIBUTION |
| | INPUT DOES NOT FOLLOW NORMAL DISTRIBUTION | SELECT FIXED THRESHOLD |

Fig. 3

ANALYSIS DEVICE AND ANALYSIS METHOD

CROSS-REFERENCE TO RELATED APPLICATIONS

This application is a National Stage application under 35 U.S.C. § 371 of International Application No. PCT/JP2019/006723, having an International Filing Date of Feb. 22, 2019, which claims priority to Japanese Application Serial No. 2018-032366, filed on Feb. 26, 2018. The disclosure of the prior application is considered part of the disclosure of this application, and is incorporated in its entirety into this application.

TECHNICAL FIELD

The present invention relates to an analysis device and an analysis method.

BACKGROUND ART

Many approaches have been proposed for detecting an abnormal value from values monitored on the network when a network is monitored to determine whether a service on the network is abnormal. Examples of the proposed approaches include: abnormality determination based on a fixed threshold; abnormality determination in consideration of the periodicity of data (for example, SARIMA model); abnormality determination in consideration of the periodicity and the overall trend of data (for example, Holt-winters method); abnormality determination based on a combination of a plurality of data sequences (for example, correlation coefficient); and abnormality determination by deep learning (for example, Auto-Encoder). On the other hand, Patent Literature 1 discloses the technology for constructing a network service and managing the life cycle of a network service. According to Patent Literature 1, a catalog that is a model for a network service is used to construct a network service.

CITATION LIST

Patent Literature

Patent Literature 1: JP 2017-143452 A

SUMMARY OF THE INVENTION

Technical Problem

In order to apply analysis logics for abnormal determination to service abnormality determination, it is necessary to select or customize an appropriate logic according to characteristics of data and services to be monitored on the network. However, according to the conventional art as described in Patent Literature 1, such selection and customization of the analysis logics applied to service abnormality determination is entrusted to human capacity such as the operator's empirical rules. As a result, disadvantageously, the maintenance load on the operator cannot be reduced.

In light of such circumstances, an object of the present invention is to reduce the maintenance load on the operator.

Means for Solving the Problem

In order to solve the problems described above, the invention according to claim 1 provides an analysis device for analyzing services on a network, and the analysis device includes: a storage unit configured to store maintenance information collected, from the network, at a predetermined time interval and for each of the services, and a catalog describing specifications of the analysis logics; a rule application unit configured to, upon receipt of a request related to an analysis target service, apply the maintenance information over a predetermined period of the analysis target service to the application rules; an analysis logic selection unit configured to select the analysis logics for each use based on a result of the application to the application rules; and a collaborative catalog generation unit configured to generate a collaborative catalog including a combination of the catalogs describing the specifications of the selected analysis logics.

The invention according to claim 4 is an analysis method performed by an analysis device for analyzing services on a network, and a storage unit of the analysis device stores, maintenance information collected, from the network, at predetermined time intervals and for each of the services, application rules each describing a technique for applying a plurality of types of analysis logics classified by use, and a catalog describing specifications of the analysis logics, and the analysis device executes: upon receipt of a request related to an analysis target service, applying the maintenance information over a predetermined period of the analysis target service to the application rules; selecting the analysis logics for each use based on a result of the application to the application rules; and generating a collaborative catalog including a combination of the catalogs describing the specifications of the selected analysis logics.

According to the invention according to claims 1 and 4, the appropriate analysis logic that has been selected by the operator's empirical rule can be automatically selected. Therefore, the maintenance load on the operator can be reduced.

The invention according to claim 2 is the analysis device according to claim 1, wherein the catalog is a catalog describing the specifications of the analysis logics for an abnormality determination of the analysis target service, the analysis logics being classified into a preprocessing logic, a score value calculation logic, and a threshold calculation logic, and the application rules being classified into a preprocessing application rule, a score value calculation application rule, and a threshold calculation application rule.

According to the invention of claim 2, the analysis logic for abnormality determination can be automatically selected.

The invention according to claim 3 is the analysis device according to claim 1, wherein the catalog is a catalog describing the specifications of the analysis logics for an abnormality determination of the analysis target service, the analysis logics being classified into a preprocessing logic, a model calculation logic, and a future value calculation logic, and the application rules being classified into a preprocessing application rule, a model calculation application rule, and a future value calculation application rule.

According to the invention described in claim 3, the analysis logic for service demand prediction can be automatically selected.

Effects of the Invention

According to the present invention, the maintenance load on the operator can be reduced.

BRIEF DESCRIPTION OF DRAWINGS

FIG. 2 is an example of analysis logics.

FIG. 3 is an example of application rules.

DESCRIPTION OF EMBODIMENTS

Hereinafter, an embodiment for carrying out the present invention (hereinafter referred to as "the present embodiment") will be described below with reference to the drawings.

Configuration

Figure 1:
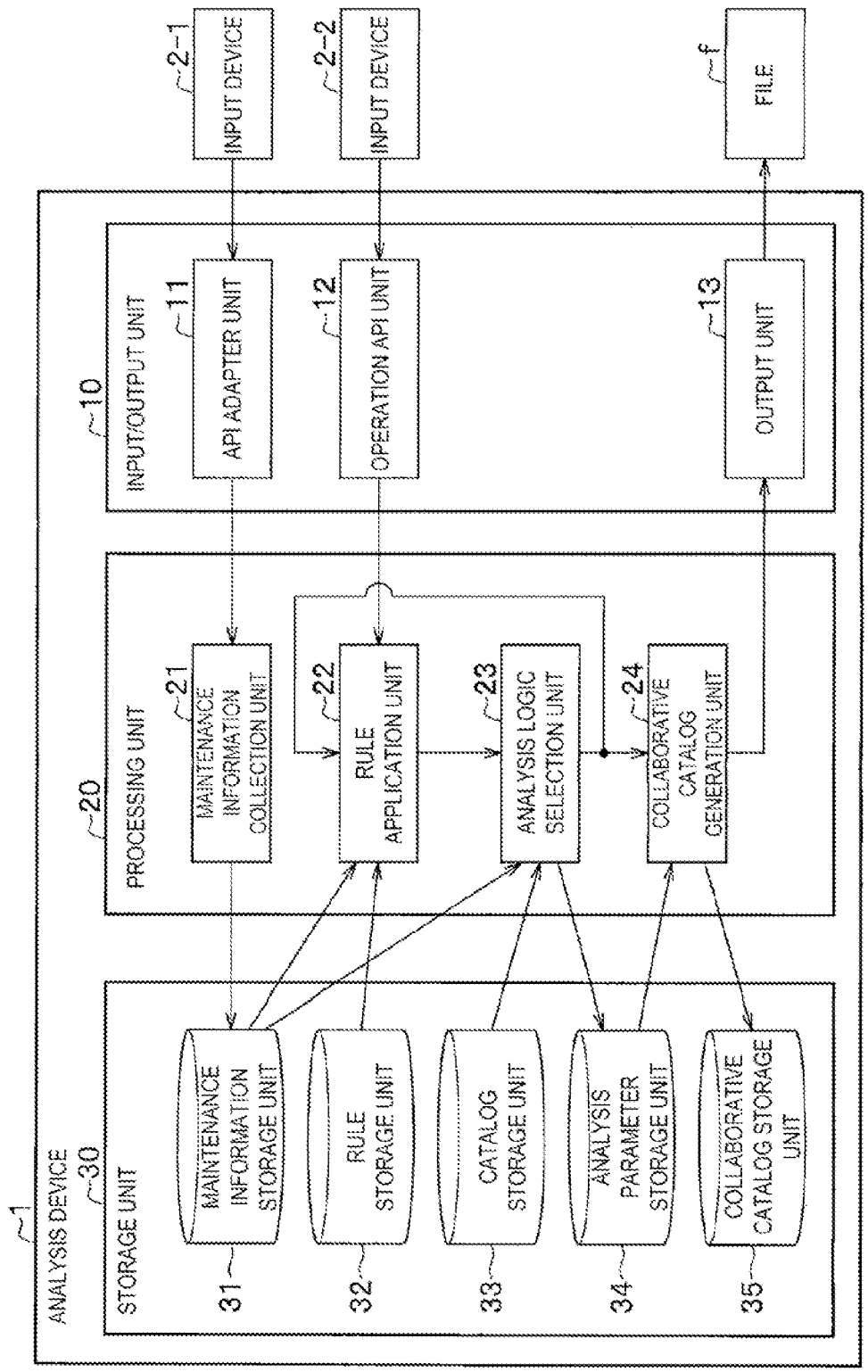
FIG. 1 is a functional configuration diagram of an analysis device according to the present embodiment.

The analysis device in the present embodiment has a catalog-driven architecture that selects and customizes appropriate analysis logic according to the following catalog and application rules. The catalog refers to a description of specifications of analysis logics for service abnormality determination. The application rules refer to a description of a technique for applying the analysis logic. That is, the analysis device according to the present embodiment determine service abnormality according to the content of the catalog. As illustrated in FIG. 1, the analysis device 1 in the present embodiment has hardware including an input/output unit 10, a processing unit 20, and a storage unit 30. A Central Processing Unit (CPU) that is a specific example of the processing unit 20 executes a program read into a memory that is a specific example of the storage unit 30, thereby implementing a method of the present embodiment.

The input/output unit 10 includes an API adapter unit 11, an operation API unit 12, and an output unit 13. API is an abbreviation of Application Programming Interface.

The API Adapter unit 11 is an interface that collects, from an input device 2-1, monitored values acquired by monitoring a network on which a service is offered. The monitored value includes, for example but is not limited to, the amount of traffic on the network, flow data, and the amount of power supplied to the server. The input device 2-1 is a network device located on the network or a server provided with an application implementing a service but is not limited thereto. The network device is, for example but not limited to, a router, a bridge, or a gateway.

The operation API unit 12 is an interface that acquires a request, which is related to selection of appropriate analysis logics by the analysis device 1, from the input device 2-2. The input device 2-2 is, for example, a console used by a service operator but is not limited thereto. The request input from the input device 2-2 includes but are not limited to, ID of an analysis target service and a service normal period during which the analysis target service normally functions.

The output unit 13 outputs a processing result of the processing unit 20 as a file f. The processing result of the processing unit 20 is, for example but not limited to, a collaborative catalog generated by a collaborative catalog generation unit 24 described below.

The processing unit 20 includes a maintenance information collection unit 21, a rule application unit 22, an analysis logic selection unit 23, and a collaborative catalog generation unit 24.

The maintenance information collection unit 21 collects monitored values collected by the API adapter unit 11 as maintenance information. The maintenance information collection unit 21 collects the maintenance information periodically (at predetermined time intervals) and for each service. For example, the maintenance information can be collected for each service by analyzing header information on a packet transferred on the network monitored by the API adapter unit 11 and identifying the service from a source port number and a destination port number in the header information.

The rule application unit 22 applies the maintenance information that satisfies a predetermined condition among the collected maintenance information to the application rules describing the technique for applying analysis logics for service abnormality determination. The maintenance information that satisfies the predetermined condition is, for example but not limited to, maintenance information over the service normal period of analysis target service. "Applying the maintenance information that satisfies the predetermined condition to the application rule" refers to determining which of the various conditions indicated in the application rules are characteristic of the maintenance information (including a characteristic of an output acquired by inputting the maintenance information into the analysis logic) corresponds to. The analysis logics and the application rules are classified by use related to service abnormality determination. Details of the analysis logics and the application rules will be described below.

The analysis logic selection unit 23 selects the analysis logics for service abnormality determination for each use, based on the results of the application to the application rules by the rule application unit 22 (details will be described below).

The collaborative catalog generation unit 24 generates a collaborative catalog including a combination of catalogs describing the specification of the analysis logics selected by the analysis logic selection unit 23.

The storage unit 30 includes a maintenance information storage unit 31, a rule storage unit 32, a catalog storage unit 33, an analysis parameter storage unit 34, and a collaborative catalog storage unit 35.

The maintenance information storage unit 31 stores the maintenance information collected by the maintenance information collection unit 21. The maintenance information stored by the maintenance information storage unit 31 is used by the rule application unit 22 and the analysis logic selection unit 23.

The rule storage unit 32 stores a predetermined application rules related to service abnormality determination (details will be described below). The application rules stored in the rule storage unit 32 is used in the rule application unit 22.

The catalog storage unit 33 stores predetermined catalogs describing the specification of the analysis logics for service abnormality determination. Catalogs stored in the catalog storage unit 33 are used by the analysis logic selection unit 23.

The analysis parameter storage unit 34 stores analysis parameters for executing the analysis logics selected by the analysis logic selection unit 23. The analysis parameters are preset for each analysis logic. That is, in each analysis logic, the analysis parameters used to execute the analysis logic are defined. However, this does not apply to the analysis logic for which the analysis parameters do not need to be set.

The collaborative catalog storage unit 35 stores the collaborative catalog generated by the collaborative catalog generation unit 24. When the analysis parameters are set for the analysis logics indicated by the catalogs constituting the collaborative catalog, the collaborative catalog storage unit 35 stores the analysis parameters together with the collaborative catalog.

Details of Analysis Logic and Application Rule

An approach for service abnormality determination is an approach for determining whether some of the monitored values collected from the network exceed (or fall below) a threshold. Thus, in the present embodiment, the description is made assuming that the analysis logics for service abnormality determination are classified into three types of uses: preprocessing logic, score value calculation logic, and threshold calculation logic. In other words, the analysis device 1 executes the three types of processing: preprocessing, score value calculation, and threshold calculation to determine service abnormality. The monitoring value is an example of the score value. The application rules are also classified into three types: a preprocessing application rule, a score value calculation application rule, and a threshold calculation application rule.

When a request for selection of appropriate analysis logics is issued, the analysis device 1 goes through the application to the preprocessing application rule, the selection of the preprocessing logic, the application of the score value calculation application rule, the selection of the score value calculation logic, the application of the threshold calculation application rule, and selection of the threshold calculation logic in this order to generate the collaborative catalog including the catalogs of the selected analysis logics. The analysis device 1 can determine service abnormality according to the collaborative catalog.

An example of the analysis logics for the service abnormality determination is illustrated in FIG. 2. As illustrated in FIG. 2, the analysis logics include but are not limited to, "keyword count", "seasonal cycle extraction", "autocorrelation", "Local Outlier Probabilities (LoOP)", "k-nearest neighbor method", "Holt-winters method", "normal distribution", "fixed threshold".

The "keyword count" is classified as the preprocessing logic. The input value is a character string, and the output value is an integer. A keyword: x is set as the analysis parameters used in the "keyword count". The "keyword count" may output the number of appearances of a keyword in the input character string.

The "seasonal cycle extraction" is classified as the preprocessing logic. The input value is a one-dimensional time series numerical value, and the output value is a cycle of a seasonal component s. No analysis parameter is set for the "seasonal period extraction".

The "autocorrelation" is classified as the preprocessing logic. The input value is a one-dimensional time series numerical value, and the output value is an autocorrelation coefficient. An integer: t is set as an analysis parameter used in the "autocorrelation". The "autocorrelation" can output the autocorrelation coefficient with respect to a data point preceding by t.

The "LoOP" is classified as the score value calculation logic. The input value is an n-dimensional time series numerical value (n: a natural number of 2 or more), and the output value is a time series numerical value (normalized to be a value of 0 to 1). An integer: k and a numerical value: λ are set as the analysis parameters used for the "LoOP".

The "k-nearest neighbor method" is classified as the score value calculation logic. The input value is a one-dimensional time series numerical value, and the output value is a time series numerical value. An integer: w and an integer: k are set as the analysis parameters used in the "k-nearest neighbor method".

The "Holt-winters method" is classified as the score value calculation logic. The input value is a one-dimensional time series numerical value, and the output value is a time series numerical value. A cycle: s (corresponding to the cycle s of the "seasonal period extraction") is set as the analysis parameters used in the "Holt-winters method". In the Holt-winters method, the output value is acquired as a difference from a predicted model.

The "normal distribution" is classified as the threshold calculation logic. The input value is a time series numerical value (which is the output value of each score value calculation logic), and the output value is a threshold value. A cumulative probability: r is set as the analysis parameter used for the "normal distribution".

The "fixed threshold" is classified as the threshold calculation logic. The input value is a time series numerical value (which is the output value of each score value calculation logic), and the output value is a threshold value. A numerical value: T is set as the analysis parameter used for the "fixed threshold".

An example of the application rules for service abnormality determination is illustrated in FIG. 3. As illustrated in FIG. 3, there are three types of application rules: "preprocessing application rule", "score value calculation application rule", "threshold calculation application rule", as described above.

In the "preprocessing application rule", when an input value is a character string, the "keyword count" is selected. In addition, when the input value is a (one-dimensional) time series numerical value, the "autocorrelation" is selected, and the autocorrelation coefficient is calculated. When the calculated autocorrelation coefficient is larger than 0.7, the "seasonal cycle extraction" is selected and the cycle of a seasonal component s is calculated. When the maintenance information as the input value is applied to the "preprocessing application rule", one of the "keyword count", the "autocorrelation", and the "seasonal cycle extraction" is selected as the preprocessing logic according to the characteristic of the maintenance information.

In the "score value calculation application rule", when the input value (for example, the output value of the selected preprocessing logic) is a two-dimensional time series numerical value, the "LoOP" (using a default parameter) is selected. In addition, when the input value is a one-dimensional time series numerical value and the cycle s is larger than 1, the "Holt-winters method" is selected. In addition, when the input value is a one-dimensional time series numerical value and the cycle s is equal to or smaller than 1, the "k-nearest neighbor method" (using a default parameter) is selected. Note that, when the input value is a there or more-dimensional time series numerical value, the "LoOP" may be selected. When the output of the preprocessing logic, as the input value, is applied to the "score value calculation application rule", one of the "LoOP", the "Holt-winters method", and the "k-nearest neighbor method" is selected as the score value calculation logic according to the characteristic of the output of the preprocessing logic. This means that the score value calculation logic is selected according to the characteristic of the maintenance information that becomes an input corresponding to the output of the preprocessing logic.

In the "threshold calculation application rule", when the input value (for example, the output value of the selected score value calculation logic) follows the normal distribution, the "normal distribution" is selected and, when not, the "fixed threshold" is selected. When the output of the score value calculation logic, as the input value, is applied to the "threshold calculation application rule", one of the "normal distribution" and the "fixed threshold" is selected as the threshold calculation logic according to the characteristic of the output of the score value calculation logic. This means that the threshold calculation logic is selected according to the characteristic of the output of the preprocessing logic, which is an input corresponding to the output of the score value calculation logic. In other words, this means that the threshold calculation logic is selected according to the characteristic of the maintenance information that becomes an input corresponding to the output of the preprocessing logic.

Processing

Processing executed by the analysis device 1 according to the present embodiment will be described below. The processing executed by the analysis device 1 includes maintenance information collection processing and collaborative catalog generation processing. The maintenance information collection processing is processing in which the maintenance information collection unit 21 (FIG. 1) stores the maintenance information, collected via the API adapter unit 11, in the maintenance information storage unit 31. The maintenance information collection processing is periodically executed. The maintenance information stored in the maintenance information storage unit 31 is collected for each service on the network being monitored.

Figure 4:
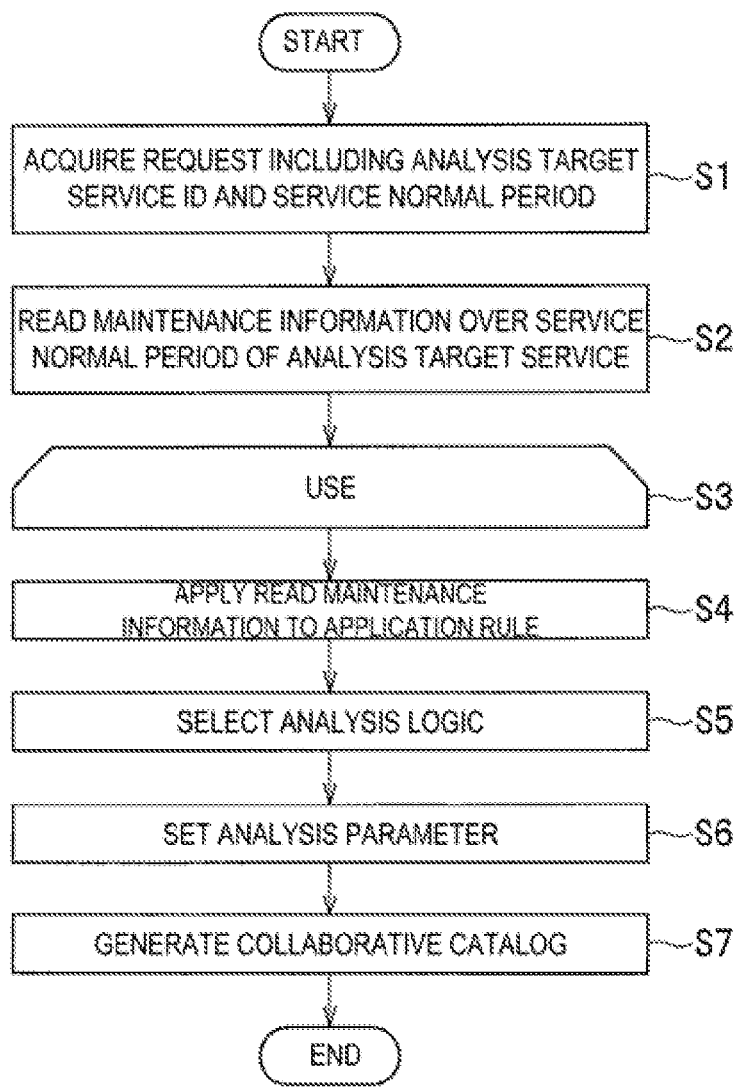
FIG. 4 is a flowchart illustrating collaborative catalog generation processing.

The collaborative catalog generation processing will be described below with reference to FIG. 4. The collaborative catalog generation processing begins when a request for selection of appropriate analysis logics is issued via the operation API unit 12. The request includes an analyzed service ID, which is an identifier of the analysis target service, and a service normal period of the analysis target service.

First, the rule application unit 22 of the analysis device 1 acquires a request including the analysis target service ID and the service normal period from the operation API unit 12 (step S1).

Next, the rule application unit 22 of the analysis device 1 reads maintenance information over the service normal period of the analysis target service from the maintenance information storage unit 31 (step S2). Specifically, the rule application unit 22 uses the analysis target service ID and the service normal period in the request as a key to read the maintenance information corresponding to the service normal period of the service identified by the analyzed service ID among the maintenance information stored in the maintenance information storage unit 31.

Next, for each use of the analysis logics, the analysis device 1 executes loop processing from a step S4 to a step S6 (step S3). Because there are three types of uses of analysis logics: the preprocessing logic, the score value calculation logic, and the threshold calculation logic, the processing in the steps S4 to the step S6 is executed three times.

Next, the rule application unit 22 of the analysis device 1 applies the maintenance information read in step S2 to the application rules (step S4). Specifically, the maintenance information is applied to the three types of application rules: the preprocessing application rule, the score value calculation application rule, and the threshold calculation application rule.

Next, the analysis logic selection unit 23 of the analysis device 1 selects analysis logics according to the application results of application to the application rules (step S5). The analysis logics are selected for each use of the analysis logic. That is, one preprocessing logic is selected for the application to the preprocessing application rule. One score value calculation logic is selected for the application to the score value calculation application rule. One threshold calculation logic is selected for the application to the threshold calculation application rule. Note that two or more analysis logics may be selected for each application rule.

Next, the analysis logic selection unit 23 of the analysis device 1 sets the analysis parameter set for the selected analysis logics (step S6). The analysis logic selection unit 23 stores the set analysis parameter in the analysis parameter storage unit 34. Note that when the analysis logic for which the analysis parameter is not set is selected, the step S6 is skipped.

After the loop processing (step S3), the collaborative catalog generation unit 24 of the analysis device 1 generates a collaborative catalog (step S7). Specifically, the collaborative catalog generation unit 24 combines catalogs describing specifications of the analysis logics (the preprocessing logic, the score value calculation logic, the threshold calculation logic) selected by the analysis logic selection unit 23 to generate the collaborative catalog. The collaborative catalog generation unit 24 stores the generated collaborative catalog in the collaborative catalog storage unit 35. The collaborative catalog generation unit 24 also reads the analysis parameters set for the selected analysis logics from the analysis parameter storage unit 34, and stores the analysis parameters in the collaborative catalog storage unit 35 together with the collaborative catalog. This terminates the collaborative catalog generation processing.

After the end of the collaborative catalog generation processing, in response to the request for selection of appropriate analysis logics, the output unit 13 of the analysis device 1 can output the collaborative catalog generated by the collaborative catalog generation unit 24.

According to the present embodiment, appropriate analysis logics that were conventionally selected according to the operator's empirical rule or the like can be automatically selected. Therefore, the maintenance load on the operator can be reduced. In particular, in the present embodiment, the analysis logics for abnormality determination can be automatically selected.

Other Embodiments

The analysis device 1 having the catalog-driven architecture can also predict service demand as well as the service abnormality determination described above, according to the content of the catalog. An approach for service demand prediction is an approach for predicting future observed values from current monitored values collected from the network according to a predetermined model. Thus, in other embodiments, the description is made assuming that analysis logics for service demand prediction are classified into three uses: a preprocessing logic, a model calculation logic, and a future value calculation logic. In other words, the analysis device 1 executes the three types of processing: preprocessing, model calculation, and future value calculation to service demand prediction. The application rules are classified into three types: a preprocessing application rule, a model calculation application rule, and a future value calculation application rule.

A catalog stored in the catalog storage unit 33 is a catalog describing the specification of the analysis logics for service demand prediction. The rule storage unit 32 also stores predetermined application rules for service demand prediction. Specifically, the rule storage unit 32 stores the preprocessing application rule, the model calculation application rule, and the future value calculation application rule.

Upon the receipt of a request for selection of appropriate analysis logics, the analysis device 1 goes through the application to the preprocessing application rule, the selection of the preprocessing logic, the application of the model calculation application rule, the selection of the model calculation logic, the application of the future value calculation application rule, and the selection of the future value calculation logic in this order to generate the collaborative catalog including a combination of catalogs of the selected analysis logics. The analysis device 1 can predict service demand according to the collaborative catalog.

In other embodiments, the analysis device 1 executes maintenance information collection processing. Also, the procedure of generating the collaborative catalog for service demand prediction is similar to the procedure of generating the collaborative catalog for service abnormality determination, and follows the collaborative catalog generation processing (see FIG. 4). The collaborative catalog generation processing for service demand prediction begins upon the receipt of a request for selection of appropriate analysis logics via the operation API unit 12. The request includes the analysis target service ID, which is an identifier of the analysis target service, and a demand sample period of the analysis target service. The demand sample period is a predetermined period before the current time, during which the analysis target service was operating.

According to other embodiments, appropriate analysis logics, which traditionally have been selected by the operator's empirical rule or the like, can be automatically selected. Therefore, the maintenance load on the operator can be reduced. In particular, the analysis logic for service demand prediction can be automatically selected.

Others

The request for selection of appropriate analysis logics, which is acquired by the operation API unit 12, may include wish information indicating a service operator's wish. The request information may be, for example but not limited to, "complete analysis within 5 minutes", "not utilize 20% or more CPU resources in analysis process that implements analysis target services". The request may include configuration information indicating specifications of a group of machines (for example a server, a network device) that operate the analysis process.

In a case where the request including the ID and the predetermined period (the service normal period, the demand sample period) of the analysis target service also includes the request information and the configuration information, when a series of analysis logics are selected in the loop processing (step S3) in the collaborative catalog generation processing (FIG. 4), processing of determining whether or not the above configuration information can satisfy the above wish information may be executed. When the request information is satisfied, the selected analysis logics are determined and a collaborative catalog is generated by the determined analysis logics (step S7). When the request information is not satisfied, another analysis logic may be selected so as to satisfy the wish information. In addition, when there is no set of analysis logics that can satisfy the request information, the output unit 13 may output an alert to the operator.

Also, in the details of application rules (FIG. 3), load information indicating loads exerted when the selected analysis logics are executed may be used as conditions (if) for selecting the analysis logics. When the request for selection of appropriate analysis logics includes the request information and the configuration information, analysis logics that satisfy the conditions of the load information can be selected (step S5 of FIG. 4).

The various techniques described in the present embodiment can be combined as appropriate. The software described in the present embodiment can be also embodied as hardware, and the hardware may be embodied as software. Other hardware, software, flow charts, and the like can be changed as appropriate without departing from the gist of the present invention.

REFERENCE SIGNS LIST

1 Analysis device
10 Input/output unit
11 API Adapter unit
12 Operation API unit
13 Output unit
20 Processing unit
21 Maintenance information collection unit
22 Rule application unit
23 Analysis logic selection unit
24 Collaborative catalog generation unit
30 Storage unit
31 Maintenance information storage unit
32 Rule storage unit
33 Catalog storage unit
34 Analysis parameter storage unit
35 Collaborative catalog storage unit

The invention claimed is:

1. An analysis device for analyzing services on a network, the analysis device comprising:
a storage unit comprising at least one memory device and configured to store i) maintenance information collected, from the network, at a predetermined time interval and for each of the services on the network, ii) application rules each describing a technique for applying a plurality of types of analysis logics that determine abnormality of analysis target services, wherein the application rules are classified by use, and iii) a catalog describing specifications of the plurality of types of analysis logics;
a rule application unit comprising at least one processor and configured to, upon receipt of a request related to a particular analysis target service, apply maintenance information among the collected maintenance information that satisfies a predetermined condition over a predetermined period of the analysis target service to the application rules, wherein applying the maintenance information comprises determining a set of conditions of various conditions indicated in the application rules that are characteristic of the maintenance information;
an analysis logic selection unit comprising at least one processor and configured to select the analysis logics that determine abnormality of the particular analysis target service based on a result of the application of the maintenance information to the application rules; and
a collaborative catalog generation unit comprising at least one processor and configured to generate a collaborative catalog including a combination of the catalogs describing the specifications of the selected analysis logics that were selected to determine abnormalities of the analysis target services.

2. The analysis device according to claim 1, wherein:
the catalog is a catalog describing the specifications of the analysis logics for an abnormality determination of the analysis target service,
the analysis logics are classified into a preprocessing logic, a score value calculation logic, and a threshold calculation logic, and
the application rules are classified into a preprocessing application rule, a score value calculation application rule, and a threshold calculation application rule.

3. The analysis device according to claim 1, wherein:
the catalog is a catalog describing the specifications of the analysis logics for a demand prediction of the analysis target service,
the analysis logics are classified into a preprocessing logic, a model calculation logic, and a future value calculation logic, and
the application rules are classified into a preprocessing application rule, a model calculation application rule, and a future value calculation application rule.

4. The analysis device according to claim 2, wherein applying the maintenance information comprises applying the maintenance information to each of the preprocessing application rule, the score value calculation application rule, and the threshold calculation application rule.

5. The analysis device according to claim 1, wherein the request related to the particular analysis target service comprises an analyzed service ID including an identifier of the particular analysis target service and a service normal period of the particular analysis target service.

6. The analysis device accordingly to claim 5, wherein the rule application unit is further configured to, upon receipt of the request related to the particular analysis target service:
utilize the analysis target service ID and the service normal period included in the request as a key to read the maintenance information corresponding to the service normal period of the service identified by the analyzed service ID among the maintenance information stored in the storage unit.

7. The analysis device accordingly to claim 1, wherein the collaborative catalog is further configured to store analysis parameters for the selected analysis logics that were selected to determine abnormalities of the analysis target services.

8. An analysis method performed by an analysis device comprising at least one processor and at least one memory device for analyzing services on a network, wherein
a storage unit of the analysis device stores i) maintenance information collected, from the network, at a predetermined time interval and for each of the services on the network, ii) application rules each describing a technique for applying a plurality of types of analysis logics that determine abnormality of analysis target services, wherein the application rules are classified by use, and iii) a catalog describing specifications of the plurality of types of analysis logics, and the analysis device executes the method comprising:
upon receipt of a request related to a particular analysis target service, applying maintenance information among the collected maintenance information that satisfies a predetermined condition over a predetermined period of the analysis target service to the application rules, wherein applying the maintenance information comprises determining a set of conditions of various conditions indicated in the application rules that are characteristic of the maintenance information;
selecting the analysis logics that determine abnormality of the particular analysis target service based on a result of the application of the maintenance information to the application rules; and
generating a collaborative catalog including a combination of the catalogs describing the specifications of the selected analysis logics that were selected to determine abnormalities of the analysis target services.

* * * * *